J. B. MITCHELL.
APPLIANCE FOR PREPARING ICED BEVERAGES OR FOR COOLING LIQUIDS.
APPLICATION FILED DEC. 20, 1918.
1,386,520.
Patented Aug. 2, 1921.
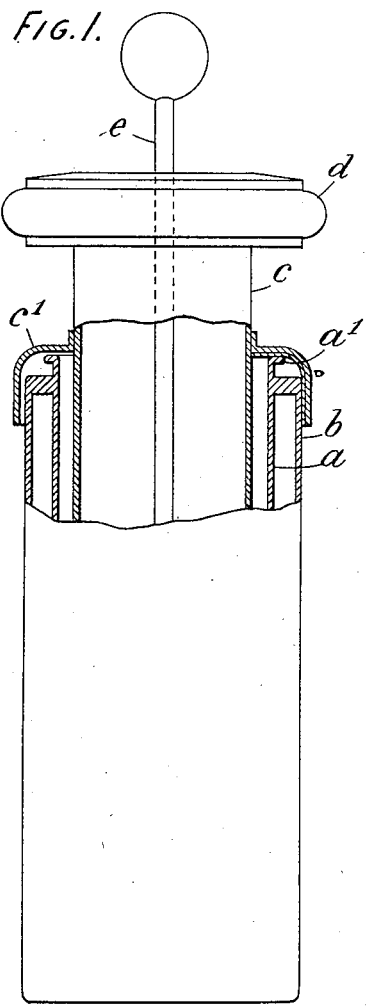
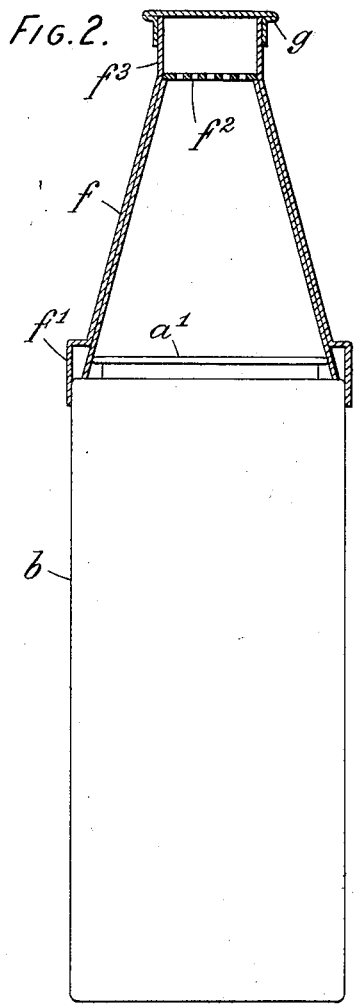
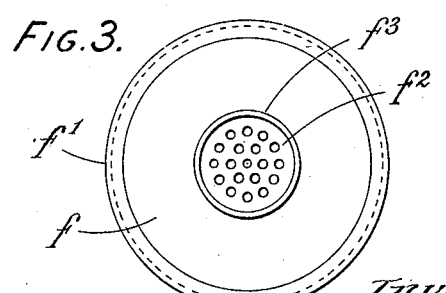

UNITED STATES PATENT OFFICE.

JOHN BATTEN MITCHELL, OF LONDON, ENGLAND.

APPLIANCE FOR PREPARING ICED BEVERAGES OR FOR COOLING LIQUIDS.

1,386,520.　　　　　　Specification of Letters Patent.　　Patented Aug. 2, 1921.

Application filed December 20, 1918. Serial No. 267,630.

*To all whom it may concern:*

Be it known that I, JOHN BATTEN MITCHELL, a subject of the King of the British Dominions, residing at London, England, have invented certain new and useful Improvements in Appliances for Preparing Iced Beverages or for Cooling Liquids, of which the following is a specification.

The specification of my United States Patent No. 1,178,744 describes a cooling or freezing apparatus comprising a cylindrical inner vessel intended to hold a freezing or cooling mixture and a jacketed cylindrical outer vessel intended to hold the liquid to be cooled or to be converted into ice.

The ice produced in such a receptacle consists of a thin film formed on the surface of the inner vessel, from which it can be easily stripped off.

The present invention has for its object, to convert a freezing apparatus of this type into an apparatus for the preparation of iced beverages.

For this purpose I utilize the outer vessel, which preferably has a vacuum insulating jacket, by providing an approximately conical sheet metal hood or decanter adapted to be mounted with its base on the open upper end of the said vessel, so as to form a water-tight joint, and closed at the apex or top by a perforated disk or a strainer surrounded by a flange, which can be closed by a metal cap.

In further describing the invention reference will be made to the accompanying drawings which show an example of an apparatus embodying my improvement and a modification of the same.

Figure 1 being an axial section of an ice-flask of the kind described in specification No. 1,178,744.

Fig. 2 a side view of the outer vessel forming part of the flask shown by Fig. 1 and a vertical section of a hood mounted on the said outer vessel after removal of the inner vessel, and Fig. 3 a plan of the hood.

In these drawings $a$ indicates the outer vessel provided with a heat-insulating jacket in the form of a mantle $b$ separated from the said vessel by an annular vacuum space, as is the case for instance, in a thermos flask, $c$ indicates the inner vessel mounted coaxially within the outer vessel by means of annular flange $c^1$ resting on the upper edge $a^1$ of the outer vessel while allowing gases to escape from the inner vessel into the atmosphere, the latter being provided with a head $d$ and a stirrer $e$ guided in the same, as is the case with the ice flask described by specification No. 1,178,744. $f$ indicates the hood, which is composed of an outer cone provided at its base with a circular flange or rim $f^1$ fitting tightly over the metallic jacket $b$ of the vessel $a$ and an inner cone fitting tightly on the edge $a^1$ of the vessel $a$, which projects above the jacket.

The upper end of the inner cone is closed by a strainer $f^2$, and the outer cone projects above the same in the form of a mouth-piece or spout $f^3$, which can be closed by a cylindrical cap $g$.

For preparing an iced beverage the inner vessel $c$ is mounted or suspended within the outer receptacle $a$, a film of ice is produced on the inner vessel in the known manner, the latter is then taken out, the cylindrical film stripped off and introduced into the outer vessel $a$ before or after it has been partly filled with the liquid mixture composing the beverage. Subsequently the hood $f$ is mounted on the outer vessel $a$, the cap $g$ applied to the hood, the whole is shaken, so as to dissolve the ice, the cap is removed, and finally the beverage thus produced is poured out through the said strainer, which holds back any particles of ice that may have remained undissolved.

The same outer vessel is thus adapted to serve consecutively for producing a film of ice and for preparing with the same an iced beverage, instead of using granulated ice.

I do not limit myself to the particular shape of the inner vessel, outer vessel and agitator shown in my prior patent specification or to the use of an overflow flange on the inner vessel, or to any special device for mounting the inner vessel concentrically on the outer vessel by means of the overflow flange while allowing gases to escape from the inner vessel.

What I claim is:—

In apparatus for preparing iced beverages, the combination of a cylindrical vessel consisting of a cylinder adapted to contain the liquid to be cooled and an insulating jacket over which the said cylinder projects, with an approximately frusto-conical hood or decanter mounted on the said vessel, the said hood being composed of an inner cone inclosing at its base the edge of the said cylinder and closed at its top by a strainer, and an outer cone mounted on the inner cone and having at its base a flange fitting over the circumference of the jacket, substantially as described.

In testimony whereof I have hereunto set my hand in presence of a subscribing witness.

JOHN BATTEN MITCHELL.

Witness:
J. WETTER.